(12) United States Patent
Kopp

(10) Patent No.: US 11,248,698 B2
(45) Date of Patent: *Feb. 15, 2022

(54) MULTIPLE ACTUATOR AND LINKAGE SYSTEM

(71) Applicant: Moog Inc., East Aurora, NY (US)

(72) Inventor: John Kopp, West Seneca, NY (US)

(73) Assignee: Moog Inc., East Aurora, NY (US)

(*) Notice: Subject to any disclaimer, the term of this patent is extended or adjusted under 35 U.S.C. 154(b) by 126 days.

This patent is subject to a terminal disclaimer.

(21) Appl. No.: 16/402,542

(22) Filed: May 3, 2019

(65) Prior Publication Data
US 2019/0257419 A1 Aug. 22, 2019

Related U.S. Application Data

(63) Continuation of application No. 14/376,000, filed as application No. PCT/US2012/024558 on Feb. 9, 2012, now Pat. No. 10,281,033.

(51) Int. Cl.
*F16H 61/28* (2006.01)
*B64C 13/28* (2006.01)
(Continued)

(52) U.S. Cl.
CPC ......... *F16H 61/2807* (2013.01); *B64C 13/30* (2013.01); *B64C 13/341* (2018.01); *G05B 15/02* (2013.01)

(58) Field of Classification Search
None
See application file for complete search history.

(56) References Cited

U.S. PATENT DOCUMENTS 1,294,970 A 7/1872 Russell
2,652,995 A 9/1953 Swain et al.
(Continued)

FOREIGN PATENT DOCUMENTS

CN 85103699 A 11/1986
CN 1154325 A 7/1997
(Continued)

OTHER PUBLICATIONS

Office Action received in corresponding Chinese Application No. 201280072035.5 (9 pages) dated Sep. 2, 2016.
(Continued)

*Primary Examiner* — Eric C Wai
(74) *Attorney, Agent, or Firm* — Harter Secrest & Emery LLP

(57) ABSTRACT

An actuator system comprising a shared link arranged to pivot about a first axis relative to a reference structure, a controlled element arranged to pivot about a second axis relative to the reference structure, a first member arranged to pivot about a third axis relative to the shared link and a fourth axis relative to the controlled member, a first actuator arranged to control a first variable distance between the third axis and fourth axis, a second member arranged to pivot about a fifth axis relative to the shared link and a sixth axis relative to the controlled element, a second actuator arranged to control a second variable distance between the fifth axis and the sixth axis, the system configured such that a change in the first variable distance causes rotation of the controlled element about the second axis when the second variable distance is constant and vice versa.

7 Claims, 15 Drawing Sheets

(51) Int. Cl.
  *B64C 13/30* (2006.01)
  *G05B 15/02* (2006.01)

(56) References Cited

U.S. PATENT DOCUMENTS

| | | | |
|---|---|---|---|
| 2,695,145 | A | 11/1954 | Lear et al. |
| 2,855,793 | A | 10/1958 | Parker et al. |
| 3,523,460 | A | 8/1970 | Beauvais |
| 3,561,784 | A | 2/1971 | Bantle |
| 3,612,106 | A | 10/1971 | Andre et al. |
| 4,225,110 | A | 9/1980 | Akkerman et al. |
| 4,228,386 | A | 10/1980 | Griffith |
| 4,531,448 | A | 7/1985 | Barnes |
| 4,555,978 | A | 12/1985 | Burandt et al. |
| 4,605,358 | A | 8/1986 | Burandt et al. |
| 4,685,550 | A | 8/1987 | Metcalf |
| 4,808,955 | A | 2/1989 | Godkin et al. |
| 4,858,491 | A | 8/1989 | Shube |
| 5,120,285 | A | 6/1992 | Grimm |
| 5,152,381 | A | 10/1992 | Appleberry |
| 5,518,466 | A | 5/1996 | Tiedeman |
| 5,628,234 | A | 5/1997 | Crook et al. |
| 5,701,801 | A | 12/1997 | Boehringer et al. |
| 5,806,806 | A | 9/1998 | Boehringer et al. |
| 5,957,798 | A | 9/1999 | Smith, III et al. |
| 6,189,436 | B1 | 2/2001 | Brooks |
| 2004/0080197 | A1 | 4/2004 | Kopetzky |
| 2004/0238688 | A1 | 12/2004 | Audren |
| 2006/0138829 | A1 | 6/2006 | Kopetzky |
| 2006/0255207 | A1 | 11/2006 | Wingett et al. |
| 2007/0018040 | A1 | 1/2007 | Wingett et al. |
| 2007/0068291 | A1 | 3/2007 | Beatty et al. |
| 2007/0262194 | A1 | 11/2007 | Agrawal et al. |
| 2008/0025770 | A1 | 1/2008 | Burnett |
| 2008/0098942 | A1 | 5/2008 | Morse et al. |
| 2008/0203223 | A1 | 8/2008 | Cyrot et al. |
| 2009/0108130 | A1 | 3/2009 | Flatt |
| 2009/0090238 | A1 | 4/2009 | Friedrich |
| 2009/0260514 | A1 | 10/2009 | Lezock et al. |
| 2009/0314884 | A1 | 12/2009 | Elliot et al. |
| 2011/0041632 | A1 | 2/2011 | Baker et al. |
| 2013/0120036 | A1 | 5/2013 | Zhu et al. |

FOREIGN PATENT DOCUMENTS

| | | | |
|---|---|---|---|
| CN | 1705835 | A | 12/2005 |
| CN | 1827474 | A | 9/2006 |
| DE | 10021324 | A1 | 11/2001 |
| DE | 102010024121 | A1 | 12/2011 |
| EP | 0382903 | A2 | 8/1990 |
| EP | 1721826 | A1 | 11/2006 |
| FR | 70758 | E | 7/1959 |
| FR | 2706966 | A | 12/1994 |
| FR | 2906220 | A1 | 3/2008 |
| GB | 593642 | A | 10/1947 |
| GB | 730561 | A | 5/1955 |
| GB | 1500404 | A | 2/1978 |
| JP | S5077044 | A | 6/1975 |
| JP | S61157870 | A | 7/1986 |
| JP | H03113156 | A | 5/1991 |
| JP | H10141499 | A | 5/1998 |
| JP | 2001271808 | A | 10/2001 |
| JP | 2006522295 | A | 9/2006 |
| JP | 2007176486 | A | 7/2007 |
| JP | 2008137436 | A | 6/2008 |
| WO | 1985004459 | A1 | 10/1985 |
| WO | 2008028184 | A2 | 3/2008 |
| WO | 2009020452 | A1 | 2/2009 |
| WO | 2010078082 | A1 | 7/2010 |

OTHER PUBLICATIONS

Recksiek, Advanced High Lift System Architecture with Distributed Electrical Flap Actuation, AST 2009, Mar. 29-30, Hamburg, Germany.

Charrier, Electric Actuation for Flight & Engine Control: Evolution & Challenges, SAE-ACGSC Mtg 99, Feb. 28-Mar. 2, 2007 Boulder Meeting.

Wu et al., Fault-Tolerant Joint Development for the Space Shuttle Remote Manipulator System: Analysis and Experiment, Robotics and Automation, IEEE Transactions, Oct. 1993, vol. 9, Issue 5, Houston, Texas.

Liscouet et al., Evaluation of Architectures for Electromechanical Actuators, 26th International Congress of the Aeronautical Sciences, 2008.

The International Search Report of the searching authority for PCT Application Serial No. PCT/US2014/023284 Publication No. WO/2014/150446 AI; dated Aug. 1, 2014.

The International Search Report and Written Opinion of the searching authority for PCT Application Serial No. PCT/US2013/025459; Publication No. WO/2013/120036 AI; dated Jul. 23, 2013.

The International Search Report (ISR) and Written Opinion of the searching authority for PCT Application Serial No. PCT/US2012/024558; Publication No. WO 2013/119242 AI; dated Nov. 19, 2012.

The (113/373) International Preliminary Report on Patentability Chapter I for International Patent Application No. PCT/ US2012/024558; Publication No. WO 2013/119242 AI; dated Aug. 12, 2014.

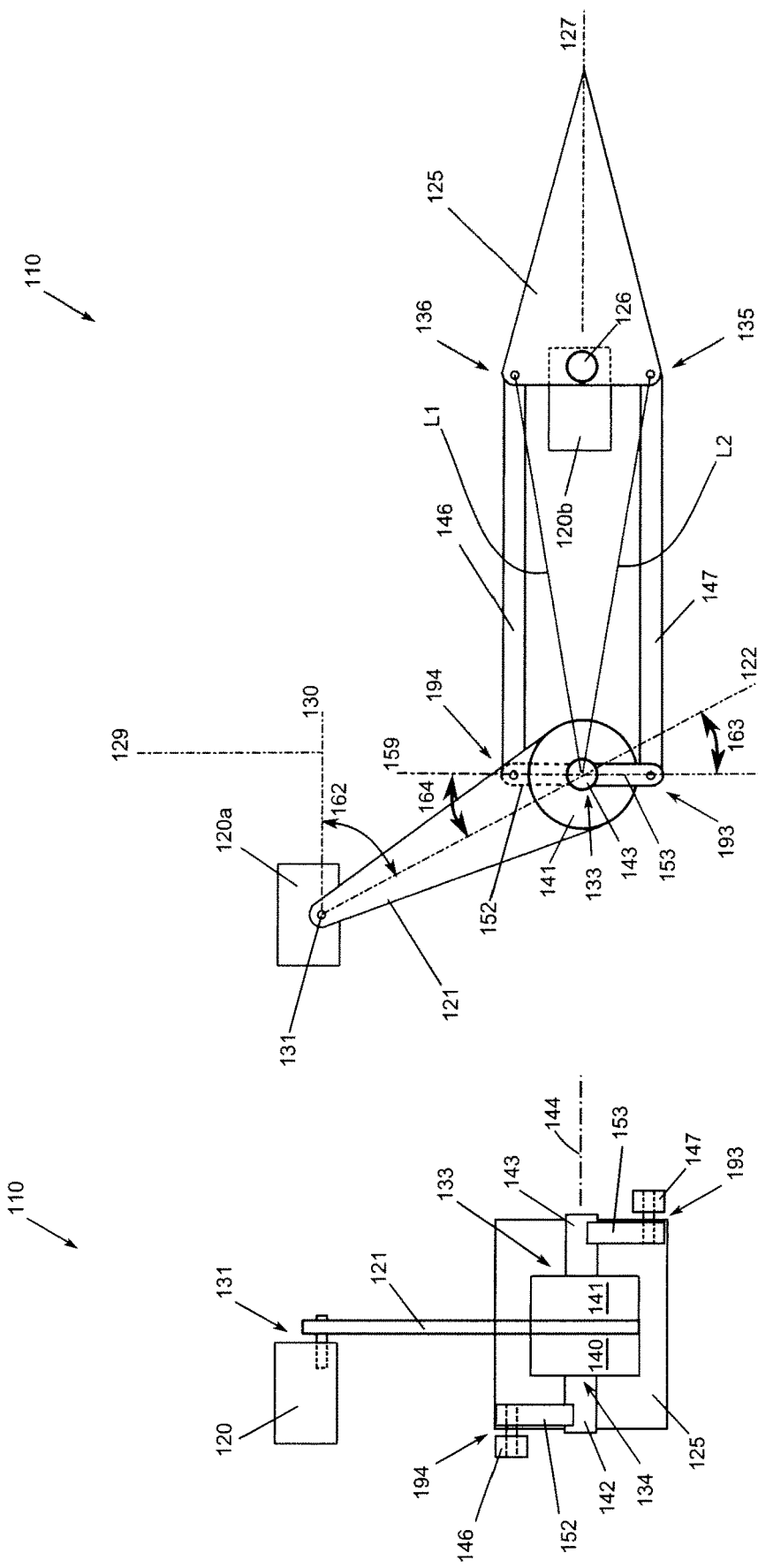

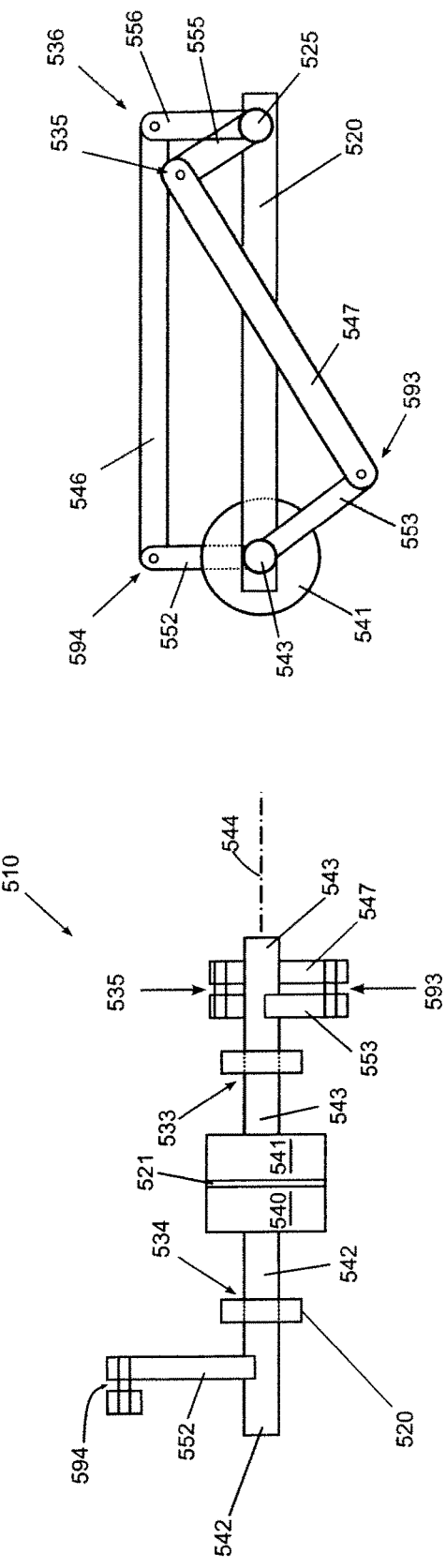
FIG. 12
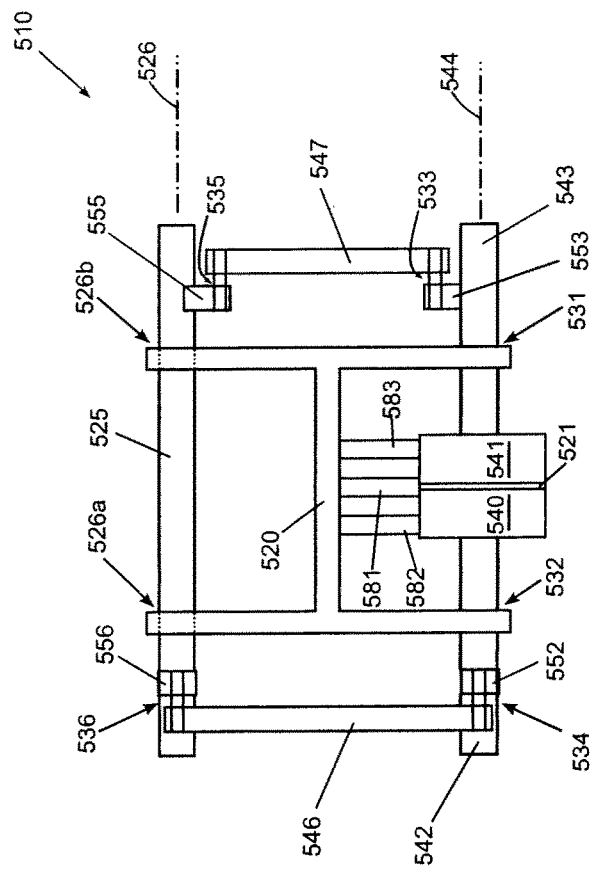
FIG. 13
FIG. 11

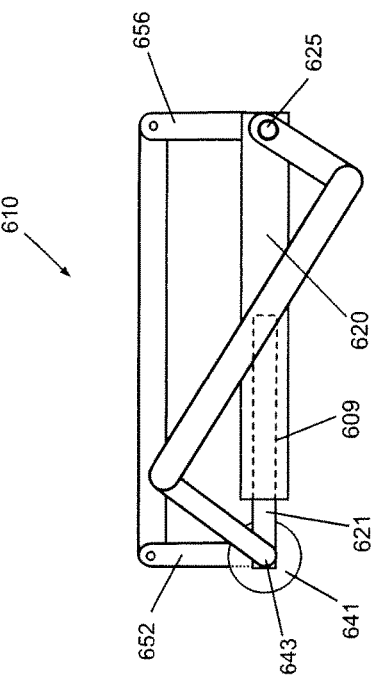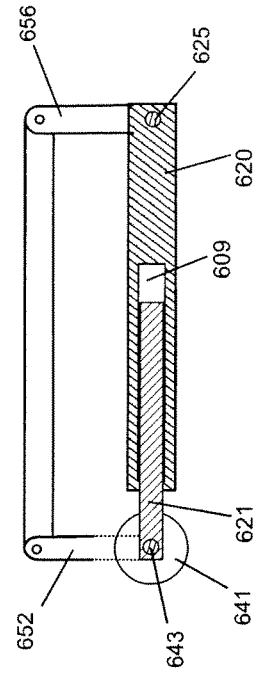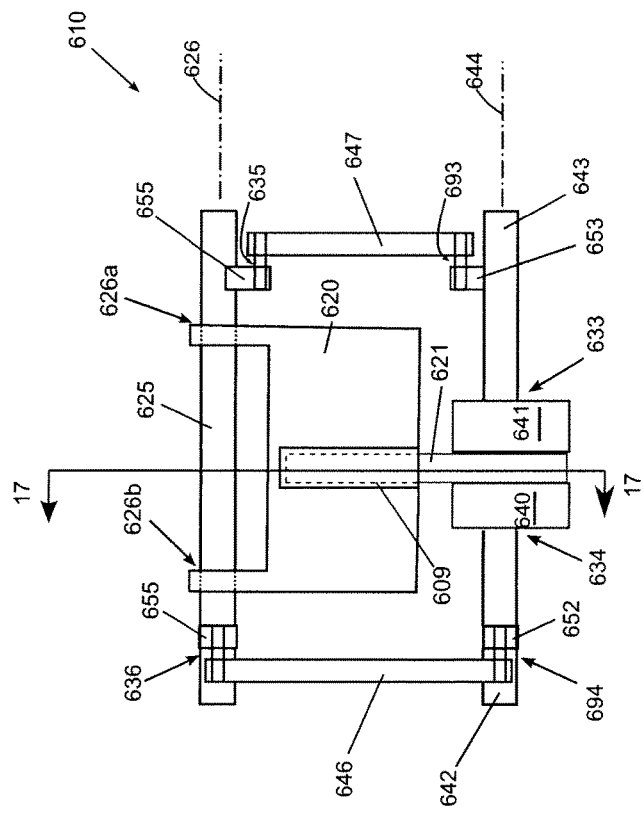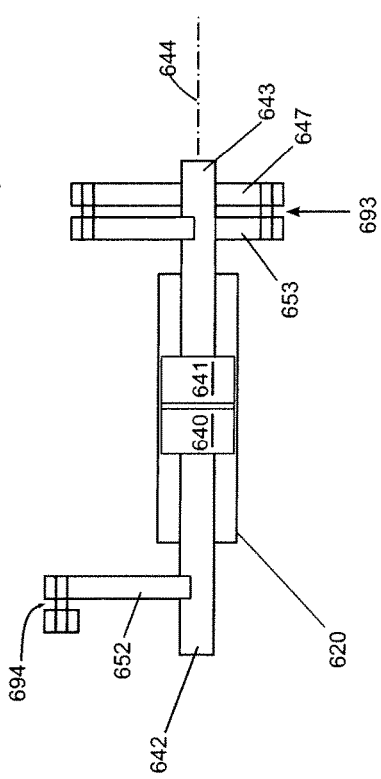

MULTIPLE ACTUATOR AND LINKAGE SYSTEM

BACKGROUND OF THE INVENTION

The present invention relates generally to the field of actuator systems, and more specifically to an electromechanical redundant actuator.

BACKGROUND ART

Redundant actuator systems are generally known. These systems typically arrange multiple actuators in a way in which their displacement is summed, or their torque is summed.

BRIEF SUMMARY OF THE INVENTION

With parenthetical reference to the corresponding parts, portions or surfaces of the disclosed embodiment, merely for the purposes of illustration and not by way of limitation, the present invention provides an actuator system comprising a shared link (121) configured and arranged for pivotal movement about a first axis (131) relative to a reference structure (120), a controlled element (125) configured and arranged for pivotal movement about a second axis (126) relative to the reference structure (120), a first member configured and arranged for pivotal movement about a third axis (134) relative to the shared link and configured and arranged for pivotal movement about a fourth axis (136) relative to the controlled element, the third axis (134) and the fourth axis (136) offset by a first variable distance (L1), a first actuator (140) configured and arranged to control the first variable distance, a second member configured and arranged for pivotal movement about a fifth axis (133) relative to the shared link and configured and arranged for pivotal movement about a sixth axis (135) relative to the controlled element, the fifth axis (133) and the sixth axis (135) offset by a second variable distance (L2), a second actuator (141) configured and arranged to control the second variable distance, and the actuators, shared link, first member, second member and controlled element operatively configured and arranged such that a change in the first variable distance rotates the controlled element (125) about the second axis when the second variable distance is constant, and a change in the second variable distance rotates the controlled element (125) about the second axis when the first variable distance is constant.

The first, second, third, fourth, fifth and sixth axis may be substantially parallel to each other. The fourth axis and the sixth axis may be positioned on opposite sides of an imaginary line through the third axis and the second axis. The fourth axis (536) and the sixth axis (535) may be positioned on the same side of an imaginary line through the third axis and the second axis. The third axis may be coincident with the fifth axis. The first axis may be coincident with the third axis. The first axis may be coincident with the fifth axis.

The system may further comprise a brake (381) configured and arranged to limit rotation of the shared link about the first axis. The actuator system may further comprise a brake configured and arranged to hold the first variable distance or the second variable distance constant. The system may further comprise a spring (382) configured and arranged to bias rotation of the shared link about the first axis. The system may further comprise a spring configured and arranged to bias rotation of the controlled element about the second axis. The system may further comprise a damper (383) configured and arranged to dampen rotation of the shared link about the first axis. The first member may comprise a linear spindle (296).

The first member may comprise a first link (152) and a second link (146), the first link (152) configured and arranged for pivotal movement about the third axis (134), the second link (146) configured and arranged for pivotal movement about the fourth axis (136), and the first link (152) configured and arranged for pivotal movement about a seventh axis (194) relative to the second link (146). The first actuator may comprise a rotary actuator (140) mounted on the shared link (121) and configured and arranged to control rotary movement between the shared link (121) and the first link (152). The second member may comprise a third link (153) and a fourth link (147), the third link (153) configured and arranged for pivotal movement about the fifth axis (133), the fourth link (147) configured and arranged for pivotal movement about the sixth axis (135), and the third link (153) configured and arranged for pivotal movement about an eighth axis (193) relative to the fourth link (147). The second actuator may comprise a rotary actuator (141) mounted on the shared link (121) and configured and arranged to control rotary movement between the shared link (121) and the third link (153).

The seventh axis (494) and the eighth axis (493) may be on the same side of an imaginary line through the third axis and the second axis. The seventh axis (194) and the eighth axis (193) may be on opposite sides of an imaginary line through the third axis and the second axis. The spring may be selected from a group consisting of a torsional spring, a linear spring, and a flexure. The damper may be selected from a group consisting of a linear damper and a rotary damper. The first actuator and the second actuator may comprise a stepper motor or a permanent magnet motor. The first actuator may comprise a motor output shaft and may further comprise a planetary gear stage between the motor output shaft of the first member. The controlled element may be a shaft or an aircraft control surface. The controlled element may be selected from a group consisting of a wing spoiler, a flap, a flaperon and an aileron. The reference structure may be selected from a group consisting of an actuator frame, an actuator housing, and an airframe.

In another aspect, the invention provides an actuator system comprising an element (125) configured for rotary movement about a first axis (126) relative to a reference structure (120), a linkage system connected to the element (125) and the reference structure (120), the linkage system having a link (121) configured for rotary movement about a second axis (131) relative to the reference structure, the first axis and the second axis being substantially parallel and operatively offset a substantially constant distance, the linkage system configured and arranged such that a first angle of rotation (161) between the element and the reference structure may be driven independently of a second angle of rotation (162) between the link (121) and the reference structure (120), a first actuator (140) connected to the linkage system and arranged to power a first degree of freedom (164) of the linkage system, a second actuator (141) coupled to the linkage system and arranged to power a second degree of freedom (163) of the linkage system, the first degree of freedom and the second degree of freedom being independent degrees of freedom, wherein the first actuator (140) may be configured and arranged to drive rotation of the element about the first axis when the second degree of freedom may be operatively locked.

The element may be connected to the reference structure through a bearing. The link may be connected to the reference through a bearing. The linkage system may comprise five links (152, 153, 146, 147 and 121). The linkage system may be connected to the element through a pivot joint. The first actuator (140) may power an angle (164) between two connected links (121/152) in the linkage system. The first actuator may power a distance between two joints (134/136) in the linkage system. The first actuator may comprise a rotary actuator and the rotary actuator may have an axis of rotation substantially the same as the second axis. The first actuator may comprise a rotary motor or an electric motor. The first actuator may comprise a planetary gear. The first actuator may be mounted on the link. The first actuator may be connected to the reference through a pivot connection. The system may further comprise a brake configured and arranged to limit rotation of the link about the second axis. The system may further comprise a brake configured and arranged to hold one degree of freedom of the linkage system constant. The system may further comprise a spring configured and arranged to bias rotation of the link about the second axis. The system may further comprise a spring configured and arranged to bias rotation of the element about the first axis. The system may further comprise a damper configured and arranged to dampen rotation of the link about the second axis. The linkage system may comprise a linear spindle. The spring may be selected from a group consisting of a torsional spring, a linear spring, and a flexure. The damper may be selected from a group consisting of a linear damper and a rotary damper. The first actuator and the second actuator may comprise a stepper motor or a permanent magnet motor. The element may be selected from a group consisting of a shaft and an aircraft control surface. The element may be selected from a group consisting of a wing spoiler, a flap, a flaperon and an aileron. The reference structure may be selected from a group consisting of an actuator frame, an actuator housing, and an airframe.

In another aspect, the invention provides an actuator system comprising an element (125) configured for rotary movement about a first pivot (126) relative to a reference structure (120), a first linkage (146, 152, 121) connected to the element at a first element connection (136) offset from the first pivot (126) and extending from the first element connection (136) to a first reference connection (131) of the reference offset from the first pivot (126), a second linkage (147, 153, 121) connected to the element at a second element connection (135) offset from the first pivot (126) and extending from the second element connection (135) to a second reference connection (131) of the reference offset from the first pivot (126), the element (125) and the first linkage forming a first system linkage having at least two independent degrees of freedom, the element (125) and the second linkage forming a second system linkage and having at least two independent degrees of freedom, a first motor (140) connected to the first linkage, a second motor (141) connected to the second linkage and movable independent of the first motor, the first linkage and the second linkages coupled so as to share a degree of freedom, the first motor (140) configured and arranged to power a degree of freedom in the first linkage, the second motor (141) configured and arranged to power a degree of freedom in the second linkage, and one of the motors (140) configured and arranged to move the element (125) relative to the reference (120) when the other of the motors (141) operatively locks the powered degree of freedom.

In another aspect, the invention provides an actuator comprising a shared link (121) pivotally connected (131) to a reference structure (120), a controlled element (125) pivotally connected (126) to a reference structure (120), a first electric motor (140) mounted on the shared link (121), the first electric motor (140) having a drive shaft (152) coupled to a proximal end of an upper link (46), a second electric motor (141) mounted on the shared link (121), the second electric motor (141) having a drive shaft (153) coupled to a proximal end of a lower link (147), the upper link (146) having a distal end pivotally connected (136) to the controlled element (125), the lower link having a distal end pivotally connected (135) to the controlled element (125), whereby actuation of one of the motors while holding the other of the motors still causes rotation of the controlled link (125) relative to the reference structure (120).

In another aspect, the invention provides a method of controlling an actuator system comprising the steps of providing an actuator system comprising a shared link (121) configured and arranged for pivotal movement about a first axis (131) relative to a reference structure (120), a controlled element (125) configured and arranged for pivotal movement about a second axis (126) relative to the reference structure (120), a first member configured and arranged for pivotal movement about a third axis (134) relative to the shared link and configured and arranged for pivotal movement about a fourth axis (136) relative to the controlled element, the third axis (134) and the fourth axis (136) offset by a first variable distance (L1), a first actuator (140) configured and arranged to control the first variable distance, a second member configured and arranged for pivotal movement about a fifth axis (133) relative to the shared link and configured and arranged for pivotal movement about a sixth axis (135) relative to the controlled element, the fifth axis (133) and the sixth axis (135) offset by a second variable distance (L2), a second actuator (141) configured and arranged to control the second variable distance, and the actuators, shared link, first member, second member and controlled element operatively configured and arranged such that a change in the first variable distance rotates the controlled element (125) about the second axis when the second variable distance may be constant, and a change in the second variable distance rotates the controlled element (125) about the second axis when the first variable distance is constant, and providing power to the first actuator and the second actuator simultaneously such that the controlled element (125) is rotated about the second axis and the shared link (121) is held constant about the first axis. The first actuator and the second actuator may be provided power in opposition to each other, whereby backlash in the actuator system may be minimized.

In another aspect, the invention provides a method of controlling an actuator system comprising the steps of providing an actuator system comprising a shared link (121) configured and arranged for pivotal movement about a first axis (131) relative to a reference structure (120), a controlled element (125) configured and arranged for pivotal movement about a second axis (126) relative to the reference structure (120), a first member configured and arranged for pivotal movement about a third axis (134) relative to the shared link and configured and arranged for pivotal movement about a fourth axis (136) relative to the controlled element, the third axis (134) and the fourth axis (136) offset by a first variable distance (L1), a first actuator (140) configured and arranged to control the first variable distance, a second member configured and arranged for pivotal movement about a fifth axis (133) relative to the shared link and configured and arranged for pivotal movement about a sixth axis (135) relative to the controlled element, the fifth axis (133) and the sixth axis (135) offset by a second variable distance (L2), a second actuator (141) configured and arranged to control the second variable distance, and the actuators, shared link, first member, second member and controlled element operatively configured and arranged such that a change in the first variable distance rotates the controlled element (125) about the second axis when the second variable distance may be constant, and a change in the second variable distance rotates the controlled element (125) about the second axis when the first variable distance is constant, and providing power to the first actuator and the second actuator simultaneously such that the shared link (121) is rotated about the first axis, whereby a mechanical advantage between the first actuator and rotation of the shared link is adjusted.

BRIEF DESCRIPTION OF THE DRAWINGS

FIG. 1 is a front elevation view of a first embodiment of the actuator system.

FIG. 2 is a right side view of the actuator system shown in FIG. 1 in a first horizontal configuration.

FIG. 11 is a front elevation view of a fifth embodiment of the actuator system.

FIG. 12 is a right side view of the actuator system shown in FIG. 11.

FIG. 13 is a top view of the actuator system shown in FIG. 11.

FIG. 14 is a front elevation view of a sixth embodiment of the actuator system.

FIG. 15 is a right side view of the actuator system shown in FIG. 14.

FIG. 16 is a top view of the actuator system shown in FIG. 14.

FIG. 17 is a vertical sectional view of the actuator system shown in FIG. 16, taken generally on line 17-17 of FIG. 16.

DESCRIPTION OF THE PREFERRED EMBODIMENTS

Figure 3:
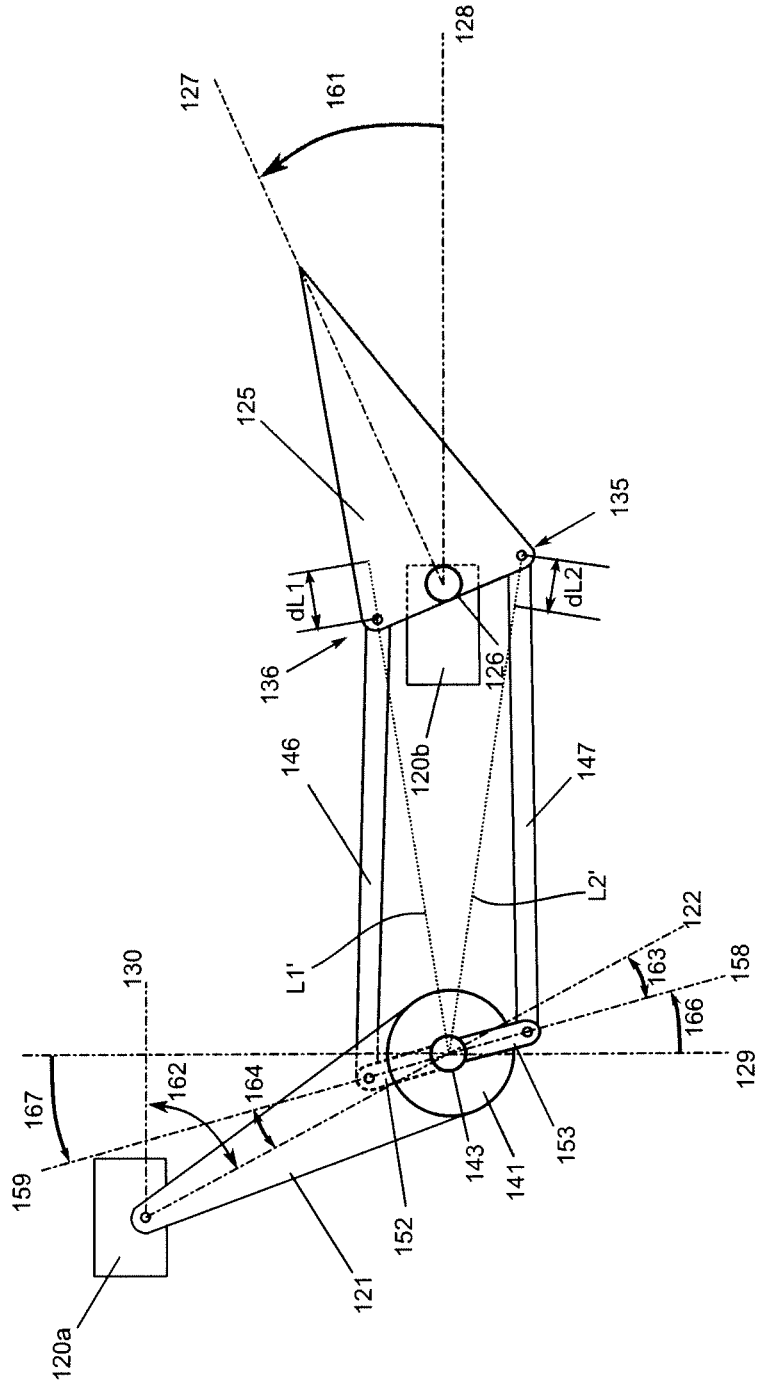
FIG. 3 is a view of the actuator system shown in FIG. 2 in a first dual motor actuated configuration.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and more particularly to FIGS. 1 and 2 thereof, this invention provides an improved actuator system, of which a first embodiment is generally indicated at 110. System 110 is shown in FIGS. 1 and 2 in a horizontal configuration. As shown, system 110 generally includes as primary elements aircraft frame 120, shared link 121, right actuator 141, left actuator 140, right drive arm 153, left drive arm 152, upper connecting rod 146, lower connecting rod 147, and flap 125.

Aircraft frame 120 acts as a reference structure upon which shared link 121 is rotationally mounted through pivot joint 131. Right rotary actuator 141 and left rotary actuator 142 are mounted on shared link 121. Rotary actuators 141 and 142 are mounted with their drive shafts coaxial and aligned along axis 144. In this embodiment, rotary actuators 141 and 142 are permanent magnet electrical servo motors with planetary gear reduction units. However, other rotary actuators, such as stepper motors or rotary hydraulic actuators, may be used as alternatives.

Right actuator 141 forms pivot joint 133 with its output drive shaft 143, which is rigidly coupled to one end of right actuator drive arm 153. The other end of right actuator drive arm 153 is connected to one end of lower connecting rod 147 through pivot joint 193. The other end of connecting rod 147 is connected to flap 125 through pivot joint 135.

Similarly, left actuator 140 forms pivot joint 134 with its output drive shaft 142, which is rigidly coupled to one end of left actuator drive arm 152. The other end of left actuator drive arm 152 is connected to one end of upper connecting rod 146 through pivot joint 194. The other end of connecting rod 146 is connected to flap 125 through pivot joint 136.

Flap 125 is rotationally coupled to aircraft frame 120 through pivot joint 126. FIGS. 1 and 2 show flap 125 in a horizontal configuration, in which center line 127 of flap 125 is horizontal relative to airframe 120 and thus generally parallel to horizontal reference line 130 of airframe 120. In this horizontal configuration, left drive arm 152 and right drive arm 153 are aligned generally parallel to vertical axis 129 of airframe 120. Right drive arm centerline 158 forms angle 163 with shared link centerline 122, which in this configuration is also equivalent to angle 164 between left drive arm 152 centerline 159 and shared link centerline 122. Shared linked 121 center line 122 forms angle 162 with horizontal reference line 130 of airframe 120.

System 110 provides a linkage system with six movable rigid links (121, 152, 153, 146, 147 and 125), eight pivot joints (131, 133, 134, 193, 194, 135, 136 and 126), and two fixed reference points 120a and 120b. Note that left and right actuators 140, 141 are classified as pivot joints 133, 134 in terms of the linkage system since their output shafts pivot about an axis of rotation, in this embodiment a common axis of rotation 144. All of the pivot joints are orientated generally parallel to axis 144.

There are two linkage paths formed between first fixed reference point 120a and second fixed reference point 120b, which together form the linkage system. The first linkage path is defined, from airframe reference 120a to right airframe reference 120b as pivot joint 131, shared link 121, left actuator 140 acting as pivot joint 134, drive arm 152, pivot joint 194, upper connecting rod 146, pivot joint 136, flap 125, and pivot joint 126. Such a linkage path is commonly referred to as a four member linkage since there are four rigid members. Similarly, the second linkage path is defined, from left airframe reference to right airframe reference 120b, as pivot joint 131, shared link 121, right actuator 141 acting as pivot joint 133, drive arm 153, pivot joint 193, lower connecting rod 147, pivot joint 135, flap 125, and pivot joint 126. The second linkage path is also a four member linkage. There are elements shared in both linkage paths, including pivot joint 131, shared link 121, flap 125, and shared pivot joint 126. In other words, three of the rigid members in each of the four member linkages are shared.

The linkage system contains two independent degrees of freedom. More specifically, the positions of all of the links and joints relative to the reference (airframe 120) can be defined by two numbers. By controlling the pivot joint angle 164 that left actuator 140 makes with shared link 121, and the pivot joint angle 163 that right actuator 141 makes with shared link 121, one can independently control two degrees of freedom of the linkage system. The degrees of freedom of the linkage system and each linkage path will become more apparent in the following sections discussing system 110 in various actuated configurations.

FIG. 3 shows system 110 in a configuration in which the system has been actuated by the concerted effort of both left and right actuators 140 and 141 in a dual motor actuation mode of operation. Flap 125 has been rotated counter clockwise by angle 161 from the configuration shown in FIG. 1. Angle 162 that shared link 121 makes with airframe horizontal reference 130 has not changed from its angle in the horizontal configuration shown in FIGS. 1 and 2. Distance L1 between pivot joint 136 and pivot 134 has been reduced by dL1 to L1' and distance L2 between pivot joint 135 and pivot 133 has been increased by dL2 to L2'.

Right actuator 141 has caused right drive arm 153 to rotate counterclockwise by angle 166 relative to shared link 121, decreasing angle 163 between right drive arm 153 and shared link centerline 122, and increasing distance L2 by dL2 to L2'. Similarly, left actuator 140 has caused left drive arm 152 to rotate counterclockwise by angle 167 relative to shared link 121 (which is equivalent to angle 166 in this second configuration), decreasing angle 164 between right drive arm 152 and shared link centerline 122, and decreasing distance L1 by dL1 to L1'. Angle 164 between left drive arm 152 and shared link 121 has been decreased by angle 167, such that angle 163 still equals angle 164. Right drive arm centerline 158 of right drive arm 153 and left drive arm centerline 159 of left drive arm 152 are still aligned with each other but are no longer aligned with reference vertical axis 129.

As right actuator 141 causes right drive arm 153 to rotate counterclockwise, lower control rod 147 is forced rightwards. As control rod 147 is forced rightwards, flap 125 is pushed rightwards at joint 135, urging flap 125 to rotate counter clockwise. Similarly, as left actuator 140 causes left drive arm 152 to rotate counterclockwise, upper control rod 146 is forced leftwards. As control rod 146 is forced leftwards, flap 125 is pulled leftwards at joint 136, also urging flap 125 to rotate counter clockwise.

When both actuators are working normally in this dual motor actuation mode, right drive arm 153 will rotate counterclockwise 166 the same general amount as left drive arm 152 rotates counter clockwise 167, causing the drive arms to remain generally parallel. Similarly, the reduction dL1 in distance L1 between pivot joint 136 and pivot 134 is about the same amount as the increase dL2 in distance L2 between pivot joint 135 and pivot 133. Because upper connecting rod 146 moves to the left the same amount as lower connecting rod 147 moves to the right, shared link 121 remains substantially fixed in rotational position relative to air frame 120.

The dual motor actuation mode is effectively causing the linkage system to act on flap 125 by both pushing and pulling at the same time, with one connecting rod pushing while the other connecting rod pulls. While actuator 141 pushes shared link 121 leftwards, actuator 140 pulls shared link 121 rightwards. The torque output of left actuator 140 and the torque output of the right actuator 141 are both translated by connecting rods 146 and 147 to act on moving flap 125. The linkage system is configured and arranged such that left and right actuators 140, 141 contribute approximately equal torques on flap 125. However, there are other modes of operation, discussed in the following sections, in which the actuators provide unequal or opposing torques.

Figure 4:
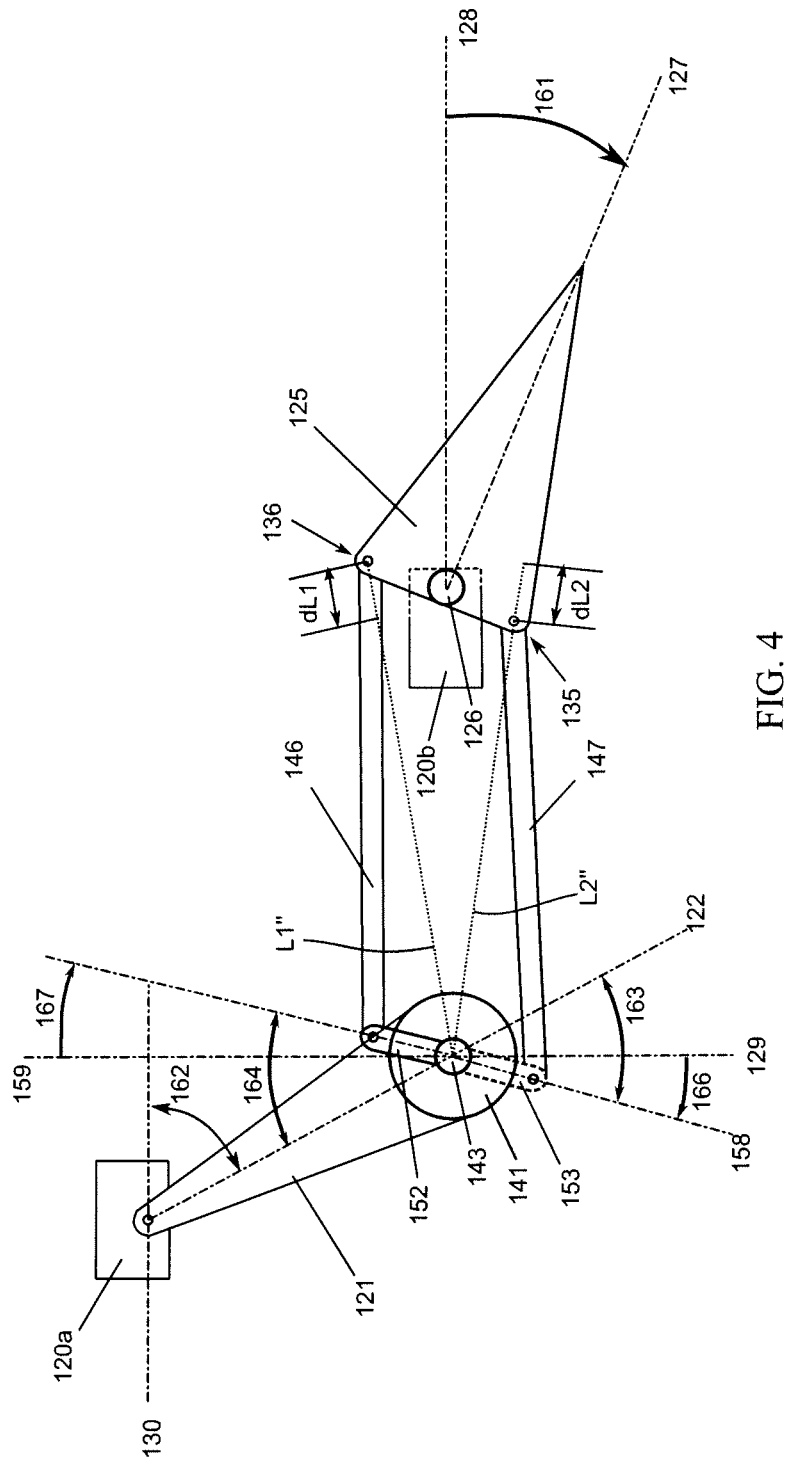
FIG. 4 is a view of the actuator system shown in FIG. 2 in a second dual motor actuated configuration.

FIG. 4 shows system 110 in a configuration in which flap 125 has been rotated clockwise by angle 161 from the configuration shown in FIG. 1. Drive arm 152 has been rotated clockwise by angle 167 such that drive arm 152 now forms angle 164 with shared link centerline 122. Drive arm 153 has been rotated clockwise by angle 166 such that drive arm 153 now forms angle 163 with shared link centerline 122. Angle 167 and angle 166 are substantially equal such that drive arm 153 and drive arm 152 are still parallel. Shared link 121 has not moved and still forms angle 162 with reference horizontal 130. Distance L1 between pivot joint 136 and pivot 134 has been increased by dL1 to L1' and distance L2 between pivot joint 135 and pivot 133 has been decreased by dL2 to L2'.

Figure 5:
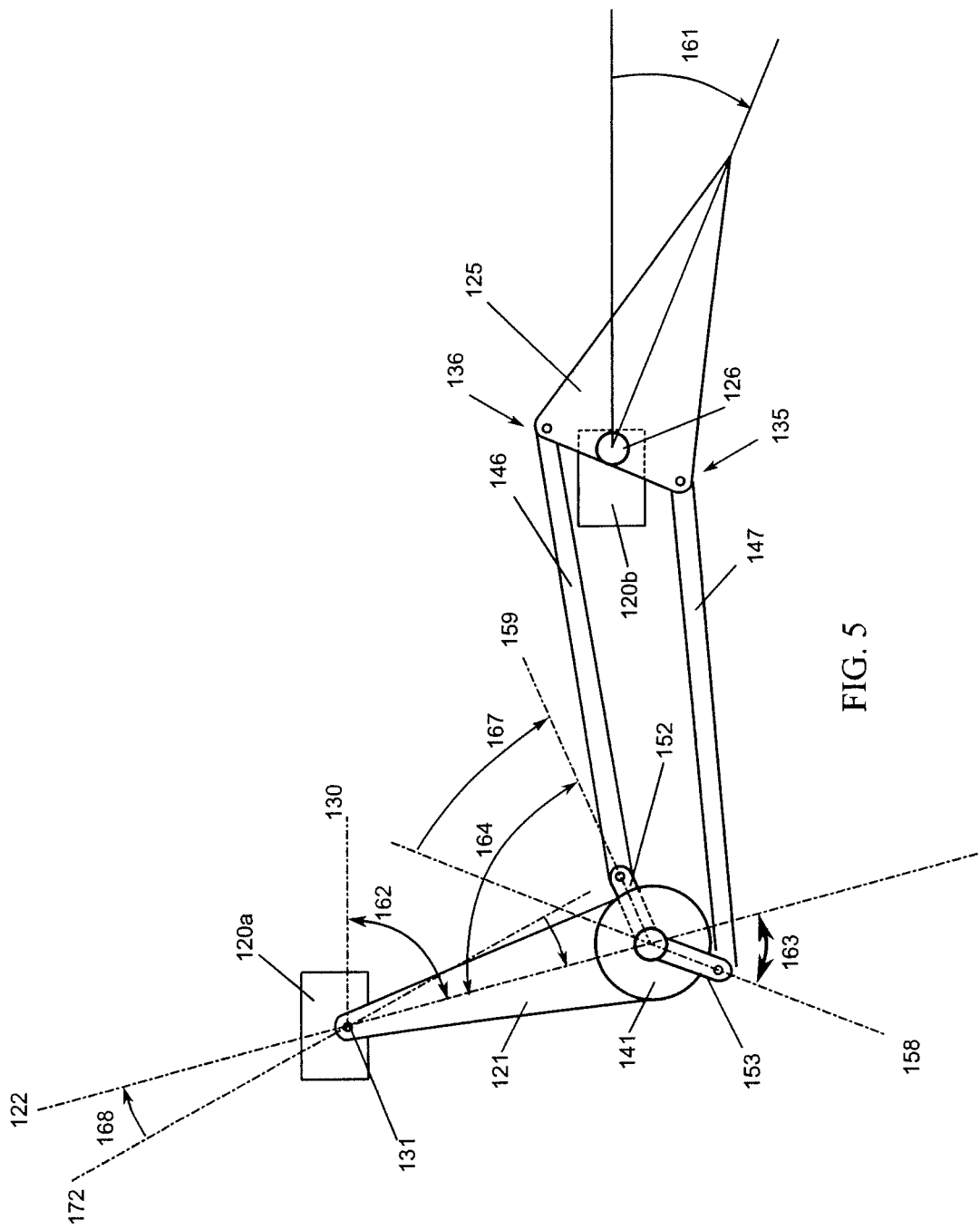
FIG. 5 is a view of the actuator system shown in FIG. 2 in a jam failure actuated configuration.

System 110 is capable of continuing to operate after one of the actuators has jammed in a jam failure actuation mode. This jam failure configuration is shown in FIG. 5. In this configuration, right actuator 141 is treated as having failed with a locked output shaft (i.e. closed failure or jam), and system 110 has been actuated from the horizontal configuration shown in FIG. 1 by left actuator 140.

Because right actuator 141 has jammed, output shaft 143 is effectively rigidly coupled to shared link 121, and angle 163 between drive arm 153 and shared link center line 122 will not change. Shared link 121, actuator 141, and drive arm 153 now form a single rigid member or link. The second linkage path through actuator 141, which was originally a four rigid member link with five pivot joints, is now a three member link with four pivot joints. The first linkage path through left actuator 140 is still a four member link, since the actuator in its path has not jammed. The total linkage system is now defined by only one degree of freedom. This single degree of freedom can be controlled by still working left actuator 140.

As shown in FIG. 5, right drive arm centerline 158 of right drive arm 153 and left drive arm centerline 159 of left drive arm 152 are no longer in alignment. Since right actuator 141 has jammed, angle 163 between right drive arm 153 and shared link centerline 122 is locked or jammed at the same angle relative to shared link centerline 122 as in the horizontal configuration shown in FIGS. 1 and 2. However, left drive arm 152 has been moved clockwise by angle 167 relative to shared link 122 to cause an increase in angle 164 between centerline 159 of left drive arm 152 and shared link centerline 122.

As left actuator 140 drives left drive arm 152 clockwise, upper connecting rod 146 is pushed rightwards. As upper connecting rod 146 is pushed rightwards, flap 125 is pushed rightwards through joint 136. This will urge flap 125 to rotate clockwise relative to air frame 120. Lower connecting rod 147 will move leftwards as flap 125 rotates clockwise. Since right actuator 141 is jammed, right drive arm 153 and shared link 121 act as a single rigid body, and as lower connecting rod 147 moves leftwards, shared link 121 also must move leftwards (rotate clockwise about 131). Shared link 121 is rotated clockwise by angle 168 from its old centerline position 172 to its current centerline position 122. As shown in FIG. 5, in this configuration angle 162 between horizontal reference 130 and shared link centerline 122 has increased from angle 162 in the configuration shown in FIG. 4.

Thus, even though right actuator 141 has jammed, left actuator is able to actuate flap 125 clockwise and counter clockwise. Instead of having two actuators pushing off each other, which keeps shared link 121 still, as in the dual actuation mode shown in FIG. 4, one actuator pushes off of shared link 121, and in response to the corresponding rotation of shared link 121, a torque is provided to flap 125.

In this example, for a given rotation amount of left actuator 140, flap 125 will rotate less than it would in the dual actuation mode, in which both left actuator 140 and right actuator 141 rotate. For example, in comparing FIG. 4 and FIG. 5, it can be seen that for an equivalent rotation of flap 125 by angle 161, angle 164, which drive arm 152 makes with shared link centerline 122, is significantly greater in FIG. 5 compared to FIG. 4.

System 110 can also be operated in a minimize backlash mode, in which right actuator 141 and left actuator 140 are commanded to apply a constant torque in opposition to each other in order to minimize backlash experienced in actuating flap 125. In other words, both actuators 140 and 141 may be configured to either always push or always pull against their respective connecting rods 146, 147, and flap 125 is moved by controlling which actuator works harder.

For example, if operating in a minimize backlash mode in which both actuator drive arms 152, 153 are configured to push against their corresponding connecting rods 146, 147, respectively, right actuator 141 is commanded to drive arm 153 counterclockwise with a small minimum torque while left actuator 140 is commanded to drive arm 152 clockwise with an equivalent minimum magnitude torque. In this case, connecting rods 146 and 147 will be constantly driven rightwards. This creates a tension in the linkage system which will drive the internal contact interfaces of all the joints to one side, such that backlash is minimized. To move flap 125, either actuator 140 or actuator 141, depending on the desired direction of rotation of flap 125, applies an increased torque in order to push its connecting rod harder. Neither actuator will be actuated to pull its corresponding connecting rod in this mode (unless there is a failure condition which is being addressed). Alternatively, the minimize backlash mode may be implemented in the same manner but by directing the actuators to always pull their corresponding connecting rod, instead of pushing. While the minimize backlash mode may cause increased friction or power usage, it offers a method of operating system 110 with virtually no backlash.

Figure 6:
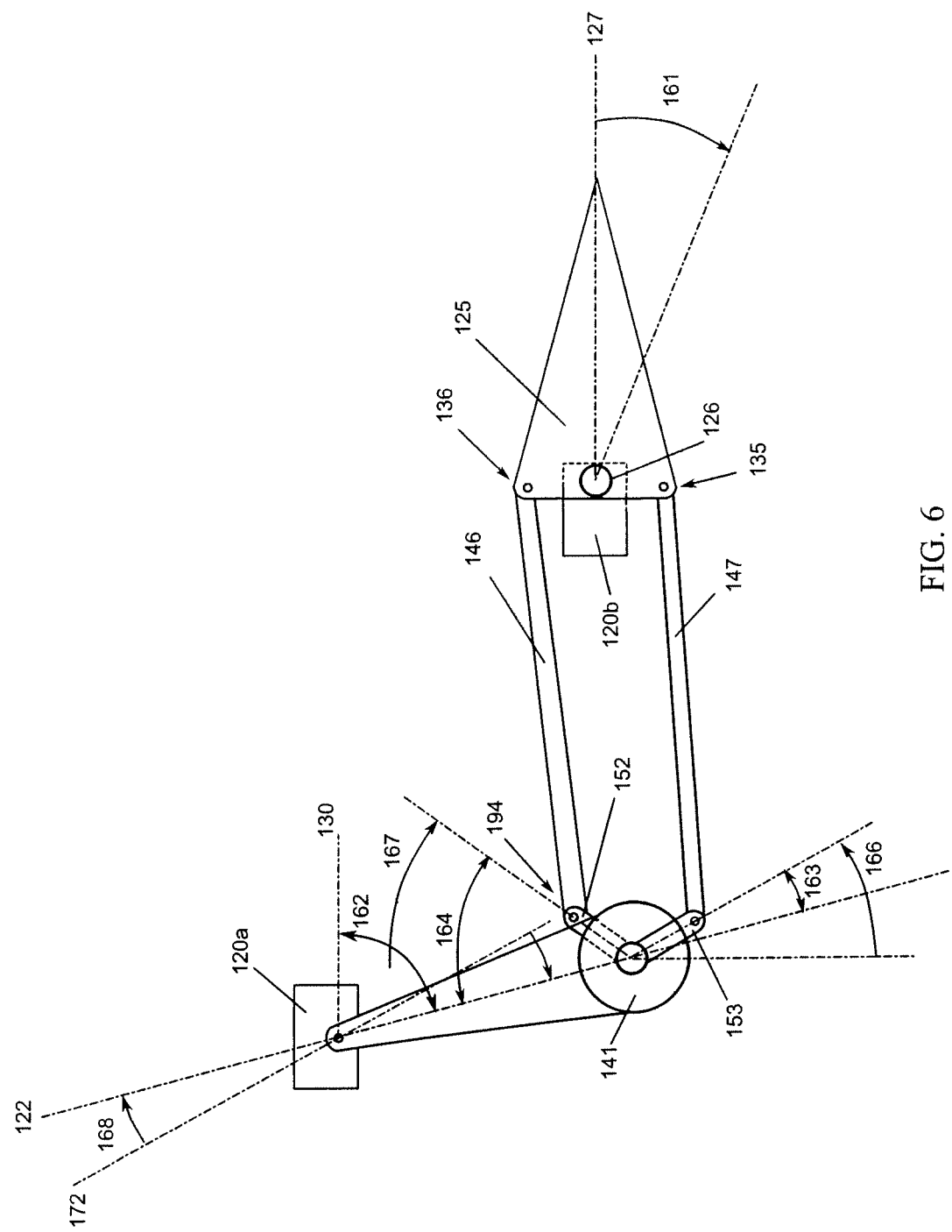
FIG. 6 is a view of the actuator system shown in FIG. 2 in a modified performance actuated configuration.

A configuration for operating system 110 in a modified performance mode is shown in FIG. 6. Modified performance mode provides a method of varying the mechanical advantage between system actuators 140, 141 and flap 125. Comparing the configurations shown in FIG. 6 to FIG. 1, even though flap 125 is positioned horizontally in both configurations, drive arms 152, 153 and shared link 121 have been adjusted in the configuration shown in FIG. 6. More specifically, shared link 121 has been rotated clockwise by angle 168, drive arm 152 has been rotated clockwise by angle 167, and drive arm 153 has been rotated counterclockwise by angle 166.

With this adjustment, the mechanical advantage between actuators 140, 141 and flap 125 has been increased. This is perhaps most easily observed when considering the amount that control rod 146 moves to the right for a given clockwise rotation of drive arm 152. In FIG. 1, since drive arm 152 is perpendicular to drive connecting rod 146, a clockwise rotation of drive rod 152 will move connecting rod 146 to the right a maximal amount. Pivot joint 194 will move with only a horizontal component. Comparing FIG. 1 to FIG. 6, since drive arm 152 makes an oblique angle with connecting rod 146 in the FIG. 6 configuration, rotation of drive arm 152 will cause both rightwards and downwards movement of pivot joint 136. Since the movement is "split" between both horizontal and vertical components, connecting rod 146 does not move as much to the right for a given angle of rotation of drive arm 152 compared to the configuration shown in FIG. 1. Effectively, the mechanical advantage in the linkage system is adjusted by varying angle 162 that shared link 121 makes with airframe 120 horizontal reference 130. By being able to adjust the mechanical advantage, flight characteristics can be modified, such as the maximum rate of movement of flap 125, the maximum angular displacement of flap 125, the backlash, the maximum torque that can be applied to flap 125, and the natural resonant frequency of the system.

As shown in FIGS. 1-6, system 110 has two independent degrees of freedom. In other words, given a fixed reference air frame 120, the positions of all other elements and pivot joints can be defined by two independent variables, X and Y, in which X and Y may be varied independently from each other. For example, angle 161 between flap 125 centerline 127 and horizontal reference 128, and angle 162 between horizontal reference 130 and shared link center line 122 define two independent variables specifying the two degrees of freedom in the system. Flap angle 161 can be varied independently of shared link angle 162, as shown in the configuration in FIG. 3. Alternatively, shared link angle 162 can be adjusted as the flap angle 161 is held constant, as shown in the configuration in FIG. 6. Thus, flap angle 161 and shared link angle 162 are independent variables. For a given flap angle 161 and shared link angle 162, angles 163 and 164 of drive arms 152 and 153 are fixed. There are only two degrees of freedom in the system, such that if two degrees are held constant (angle 161 and 162), the whole system is fixed. One can alternatively define angles 163 and 164. For a given angle 163 and angle 164, flap angle 161 and shared link angle 162 are fixed. Left actuator 140 is arranged to directly control angle 164. Similarly, right actuator 141 controls angle 163. By being able to control actuator angles 140 and 141, and therefore actuator angles 163 and 164, one can control flap angle 161 and shared link angle 162. Because there are two degrees of freedom, even if one of the actuators becomes locked, making the system now a single degree of freedom system, the other actuator can still cause a change in flap angle 161.

In general, system 110 has a mechanical linkage which is made up of two partially dependent linkage paths. Each linkage path has two degrees of freedom. The linkage paths share one degree of freedom (angle 121). Each linkage path has an actuator along its path that controls one of its degrees of freedom. By controlling both actuators, all degrees of freedom of the system are defined. If one of the degrees of freedom becomes locked, the other degree of freedom in the system can be used to change the angle of the flap. This results in jam resistance. Also, by having a second degree of freedom, the degree of freedom which is independent of the flap angle can be used to adjust the mechanical advantage of the system, or to test the system during use without adjusting the flap angle.

Figure 8:
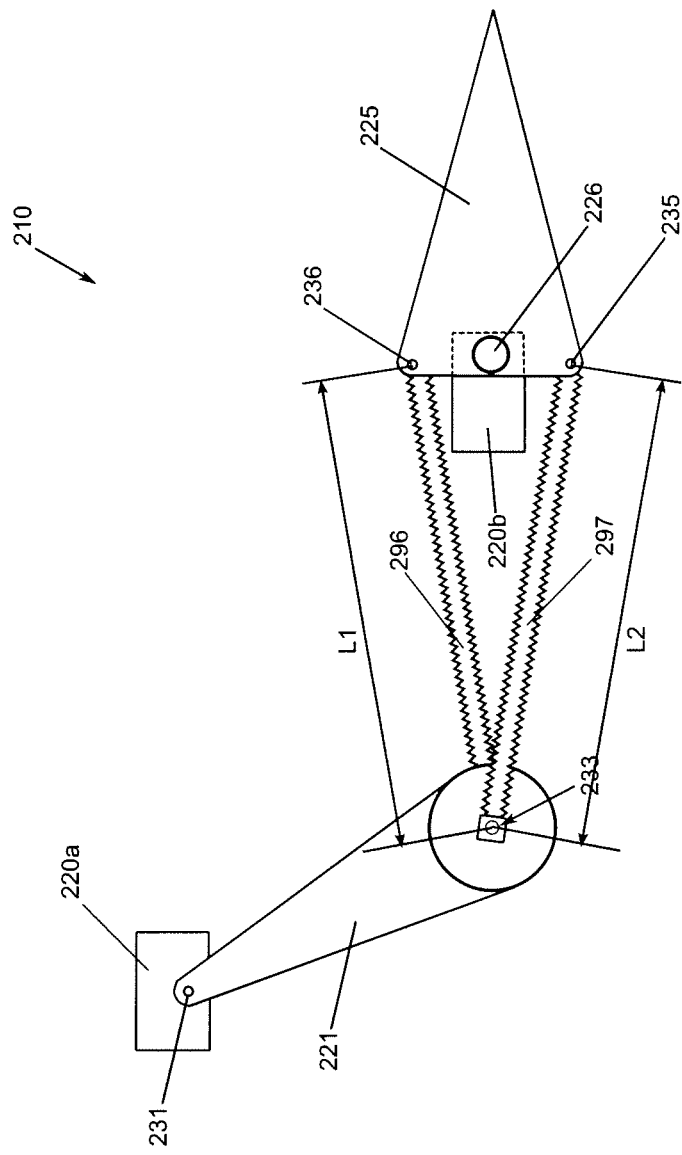
FIG. 8 is a right side view of the actuator system shown in FIG. 7.
Figure 7:
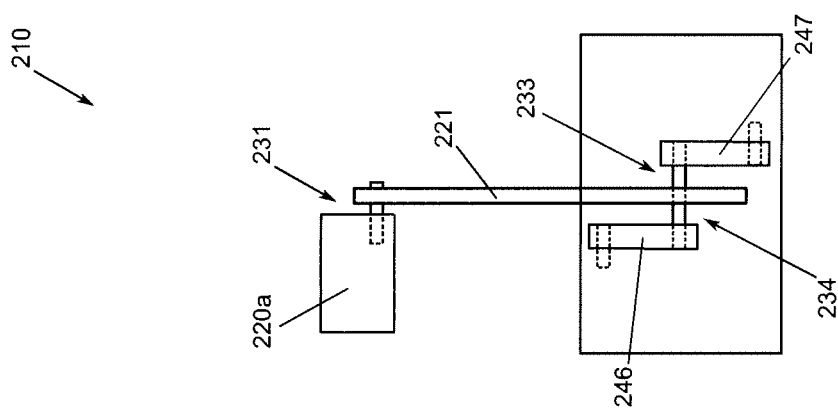
FIG. 7 is a front elevation view of a second embodiment of the actuator system.

A second embodiment 210 of the system is shown in FIGS. 7 and 8. In this embodiment, the drive arms 152, 153 and connecting rods 146, 147 in system 110 have been replaced by linear spindles 296 and 297. Similar to first embodiment 110, system 210 is defined by a mechanical linkage having two linkage paths between two positions 220a, 220b on reference 220. The first linkage path is defined from reference 220a to reference 220b and comprises pivot joint 231, shared link 221, pivot joint 233, linear spindle 297, pivot joint 235, flap 225, and pivot joint 226. The second linkage path also is defined from reference 220a to reference 220b but comprises pivot joint 231, shared link 221, pivot joint 234, linear spindle 296, pivot joint 236, flap 225, and pivot joint 226. Linear spindle 296 allows the distance L1 between joint 234 and pivot joint 236 to be adjusted. Similarly, linear spindle 297 allows the distance L2 between pivot joint 233 and pivot joint 235 to be adjusted. Each linear spindle acts as an independent degree of freedom in the mechanical linkage system of embodiment 210.

System 210 can be operated in the dual motor actuation mode described for system 110. For example, if linear spindle 296 is shortened while linear spindle 297 is elongated, flap 225 will be rotated clockwise while shared link 221 remains still.

Additionally, system 210 will continue to work in the jam failure actuation mode described for system 110. For example, if linear spindle 297 jams, adjustment of linear spindle 296 will continue to change the angle of flap 225, since rotation of shared link 221 will allow the position of pivot joint 235 to change.

Figure 9:
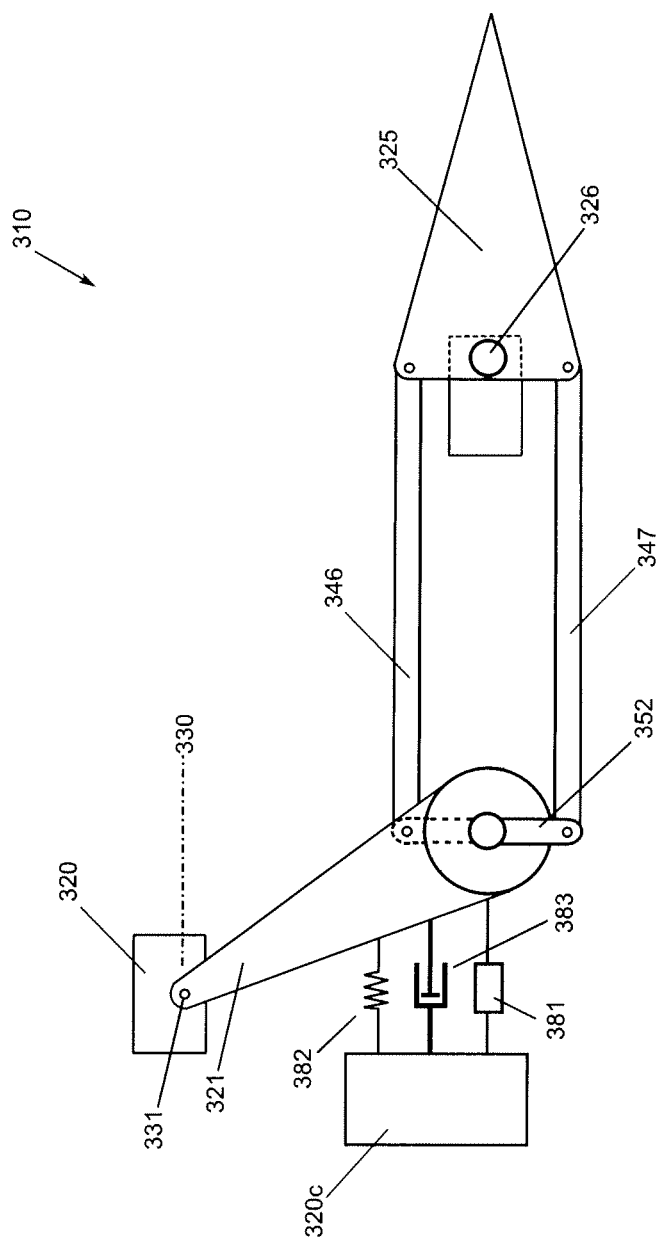
FIG. 9 is a right side view of a third embodiment of the actuator system.

A third embodiment 310 of the system is shown in FIG. 9. System 310 is identical to system 110 but with the addition of spring 382, damper 383, and brake 381. Spring 382 is positioned between shared link 321 and airframe reference 320c. In the horizontal configuration shown in FIG. 9, spring 382 is in an uncompressed state. However, any movement of shared link 321 from its position in FIG. 9 will cause spring 382 to apply a restoring force or torque. Spring 382 may be a linear coil spring, a flexure, or a torsional spring arranged about pivot joint 331. Spring 382 may alternatively be placed about pivot joint 326. Damper 383 is arranged to dampen the rotation of shared link 321 relative to reference structure 320. Spring 382 and damper 383 are useful for changing the operating dynamics of the system, such as reducing backlash and vibration.

Brake 381 is arranged to lock the position of shared link 321 relative to reference 320. When system 310 is operating in dual motor actuation mode, operation of system 310 is substantially equivalent to the operation of system 110. The effect of spring 382, damper 383, and brake 381 is important when an open failure occurs in one of the actuators. An open failure is when the actuator is no longer capable of applying a torque to its output shaft, and is in contrast to the jammed actuator failure described above with references to FIG. 5. An open failure in system 110 is problematic because, without brake 381, flap 125 would be free to move up and down regardless of the action of the remaining working actuator. This is due to the fact that the system is a two degree of freedom system, and when one degree of freedom is uncontrolled (i.e. open actuator failure) the complete kinematic state of the system can not be controlled. However, because of brake 381 in system 310, an open failure can be handled. If an open failure occurs, brake 381 is activated to lock shared link 321, effectively converting the linkage system into a single degree of freedom system. The single degree of freedom system can then be actuated by the remaining working actuator to control flap 325, as described with reference to FIG. 5.

Figure 10:
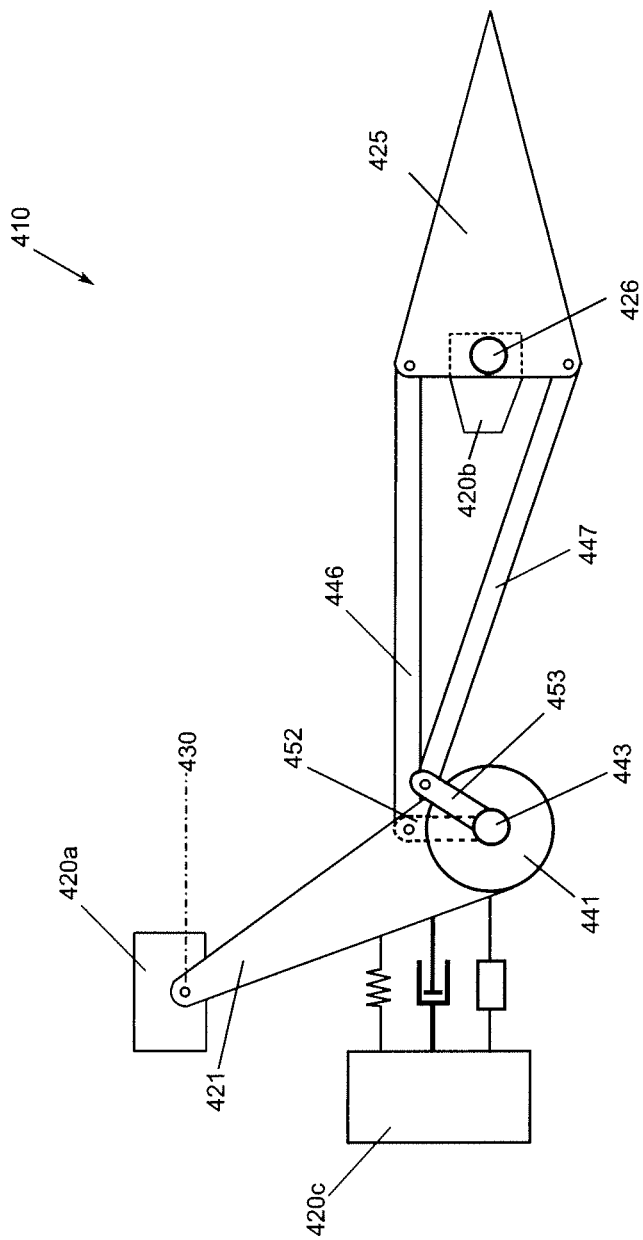
FIG. 10 is a right side view of a fourth embodiment of the actuator system.

A fourth embodiment 410 is shown in FIG. 10. In this embodiment, the drive arm configuration has been inverted. More specifically, drive arm 452 and drive arm 453 are arranged on the same side of a horizontal reference line extending through the axis of rotation 443 of actuator 441 and pivot joint 426. In this configuration, the torque that actuator 441 applies to drive arm 453 is reversed compared to the previous configurations. For example, referring to FIG. 10, when drive arm 453 pushes rightward against connecting rod 447, a counteracting counter clockwise torque is applied to shared link 421. In comparison, referring to FIG. 9, as drive arm 353 pushes rightward on connecting rod 347, a counteracting clockwise torque is applied to shared link 321. As drive arm 453 pushes rightward against connecting rod 447 and applies a counter clockwise torque on shared link 421 as described, drive arm 452 pulls leftward on connecting rod 446, and applies a counteracting clockwise torque on shared link 421. The counter clockwise torque applied to shared link 421 by drive arm 453 is canceled by the clockwise torque applied by drive arm 452. This allows for reallocating mechanical strain on the mechanical linkage system.

A fifth embodiment 510 is shown in FIGS. 11-13. System 510 is optimized as a stand alone package that can be easily transported and replaced as a line replaceable unit. More specifically, system 510 includes its own reference 520, which merely needs to be affixed to an external reference such as an airframe. There is no longer a need to mount multiple points of the linkage system to an external reference. Also, shared link 521 in system 510 is now mounted with an axis of rotation which is coincident with the axis of rotation of actuators 540 and 541. Also, system 510 has an inverted connecting rod structure.

Reference frame 520 of system 510 acts as the linkage system reference structure. Shared link 521 is a small disk to which left rotary actuator 540 and right rotary actuator 541 are mounted. Right actuator output shaft 543 passes through bearing joint 531 of frame 520. Thus, right output shaft 543 is arranged to rotate about axis 544 relative to frame 520. Similarly, left output shaft 542 passes through bearing joint 532 of frame 520 and is arranged to rotate about axis 544 relative to frame 520. Shared link 521 may be configured to rotate about axis 544 together with the stators of actuator 540 and 541. In other words, output shafts 542 and 543 can be held fixed relative to frame 520 while shared link 521, actuator 540, and actuator 541 all rotate together relative frame 520.

Drive arm 553 is rigidly mounted on output shaft 543, and drive arm 552 is rigidly mounted on output shaft 542. Drive arm 553 connects to connecting rod 547 through pivot joint 593. Similarly, drive arm 552 connects to connecting rod 546 through pivot joint 594. Connecting rod 546 connects to receiving arm 556 through pivot joint 536. Similarly, connecting rod 547 connects to receiving arm 555 through pivot joint 535. Receiving arm 555 and receiving arm 556 are both rigidly mounted to system output shaft 525. In other words, arms 555 and 556 do not rotate separately from shaft 525. Output shaft 525 is configured to drive an external load, such as an aircraft flap.

Due to the similarity in the inverted connecting rods, the operation of system 510 is similar to system 410. For example, with reference to FIG. 12, in order to drive system output shaft 525 clockwise, drive arm 553 should push rightwards on connecting rod 547 and drive arm 552 should push also rightwards on connecting rod 546. The torque applied by right actuator 541 on drive arm 553 is equal and opposite the torque applied on drive arm 552 by left actuator 540. Since the torques applied by actuator 540 and 541 cancel each other out, shared link 521 does not rotate relative to frame 520 as output shaft 525 is rotated clockwise.

In the event of a jam failure of one of the actuator, the other actuator will continue working, as in system 110 and described with reference to FIG. 5. However, shared link 521 (along with actuators 540 and 541) will rotate relative to frame 520 as output shaft 525 rotates. In order to handle open actuator failures, a brake, spring, or damper is placed between shared link 521 and reference frame 520, as described in system 410.

A sixth embodiment 610 is shown in FIGS. 14-17. In this embodiment, shared link 621 has been configured for sliding engagement with frame 620. As shown, frame 620 has opening 609, which is configured to receive shared link 621 in sliding engagement. Shared link 621 does not rotate relative to frame 620. During dual motor actuation mode operation, shared link 621 does not slide relative to frame 620. However, in jam failure operation mode, left and right movement of shared link 621 relative to frame 620 provides the linkage system with the necessary degree of freedom to continue to operate through the jam failure.

Seventh embodiment system 710 is shown in FIGS. 18-24. System 710 is very similar in general structure and operation to fifth embodiment system 510 shown in FIGS. 11-13. However, system 710 has larger bearings 726a and 726b supporting system output shaft 725 in rotating engagement with frame 720. Similarly, bearings 733 and 734 support actuators 740 and 741 and shared link 721 in pivoting relationship with frame 720. System 710 provides a compact, line replaceable unit with high mean time between failure.

Figure 18:
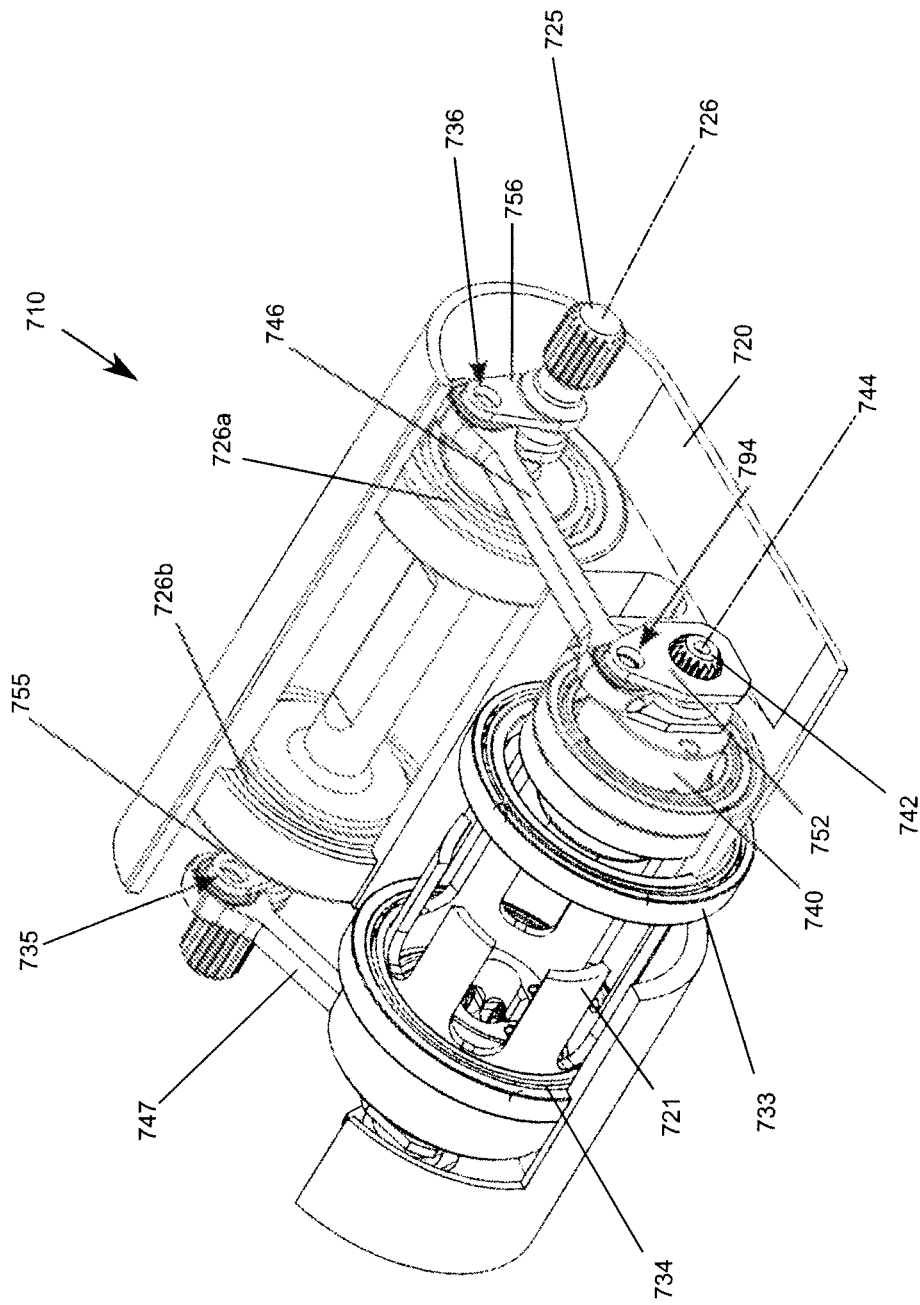
FIG. 18 is a front partial perspective view of a seventh embodiment of the actuator system.
Figure 19:
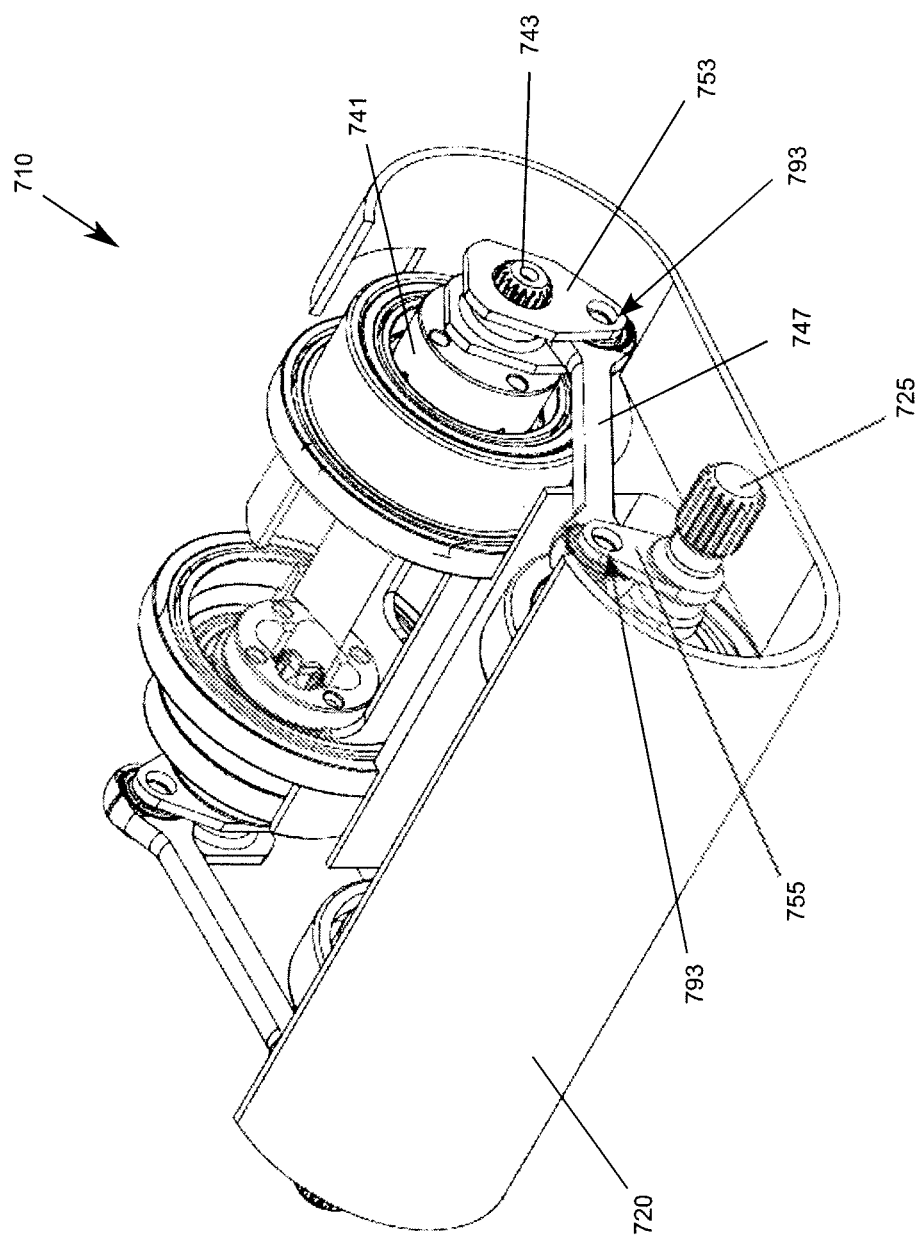
FIG. 19 is a rear partial perspective view of the actuator system shown in FIG. 18.

As shown in FIGS. 18 and 19, actuator system 710 comprises as primary elements frame 720, system output shaft 725, right actuator 740, left actuator 741, shared link 721, drive arm 752, drive arm 753, connecting rod 746, and connecting rod 747.

Frame 720 acts as both a housing and a reference structure upon which the actuator system bearings interact. For example, shared link 210 is mounted by bearings 733 and 734 for rotary motion relative to frame 720 about axis 744. Actuators 740 and 741 are mounted upon shared link 721, and also have their output shaft axes of rotation coincident with axis 744. Actuators 740 and 741 are rotary motors with output planetary gear stages. Output shaft 742 of right actuator 740 is splined and rigidly coupled to drive arm 752. Right drive arm 752 is connected to the left side of connecting rod 746 through pivot joint 794. The right side of connecting rod 746 is coupled to drive arm 756 through pivot joint 736. Drive arm 756 is rigidly coupled to system output shaft 726. System output shaft 726 is mounted to frame 720 through bearings 726a and 726b for rotary movement about axis 726. Output shaft 743 of actuator 741 is splined and rigidly connected to drive arm 753. Drive arm 753 is connected to connecting rod 747 through pivot joint 793. Connecting rod 747 is connected to drive arm 755 through pivot joint 793. Drive arm 755 is rigidly coupled to system output shaft 725.

The operation of system 710 is similar to operation of the other embodiments. Each actuator controls a single degree of freedom in a two degree of freedom system. In system 710, actuators 740 and 741 torque off of each other across shared link 721 in order to both cause a push force or both cause a pull force on connecting rods 746 and 747. In other words, actuator 740 is driven to apply a torque equal and opposite to shared link 721 as the torque applied by actuator 741. As viewed from the perspective in FIG. 18, if the torque applied by actuator 740 causes a clockwise torque on shared link 721 (which causes connecting rod 746 to be pushed rightwards), actuator 741 will be driven to cause a counterclockwise torque on shared link 721 (which causes a rightwards force pushing on connecting rod 747). System output shaft 725 will thus be driven clockwise, while shared link 721 experiences no net torque.

Figure 20:
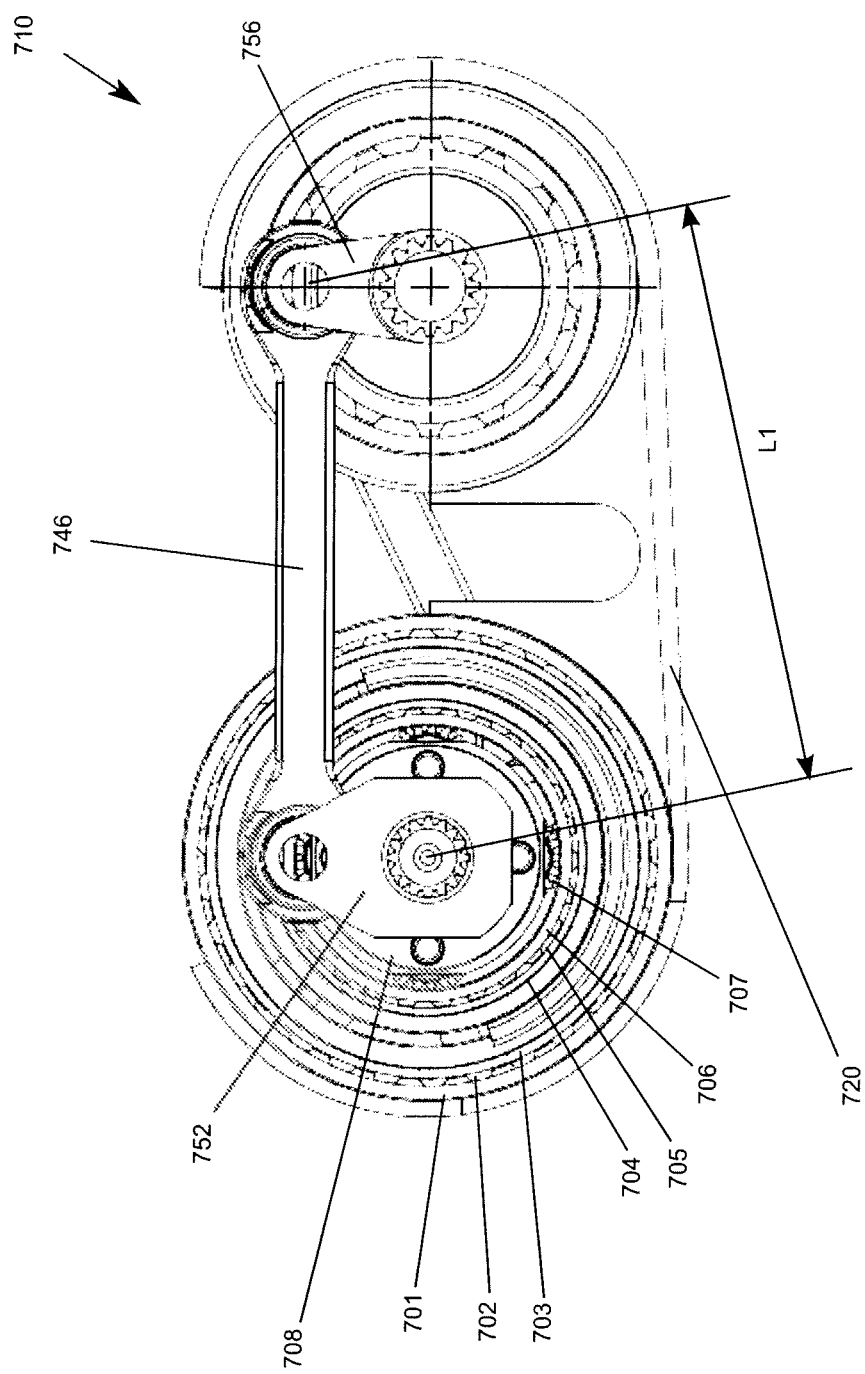
FIG. 20 is a front view of the actuator system shown in FIG. 18.
Figure 22:
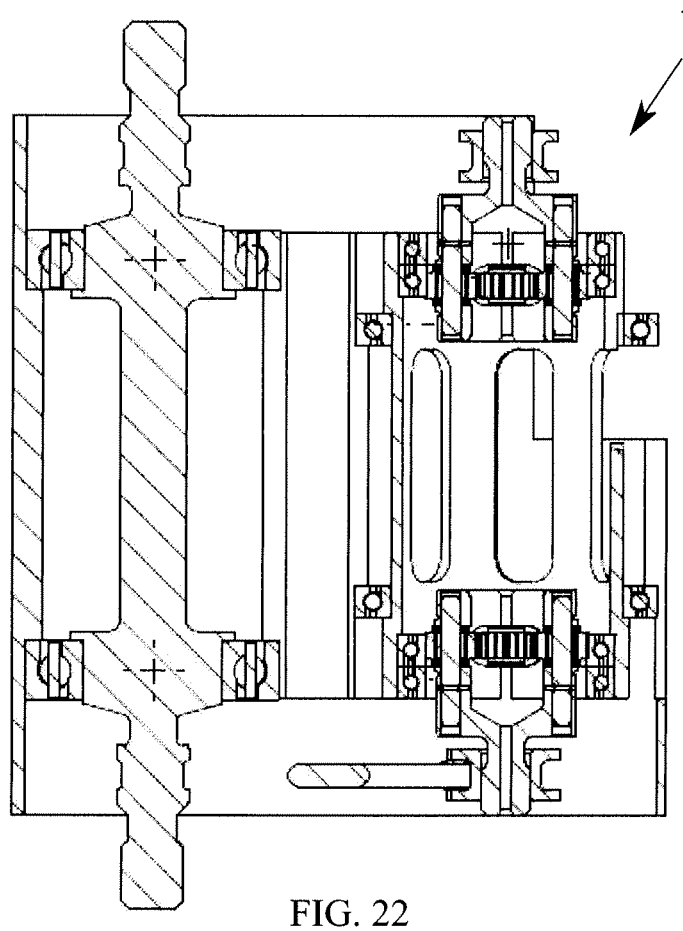
FIG. 22 is a horizontal sectional view of the actuator system shown in FIG. 21, taken generally on line 22-22 of FIG. 21.
Figure 21:
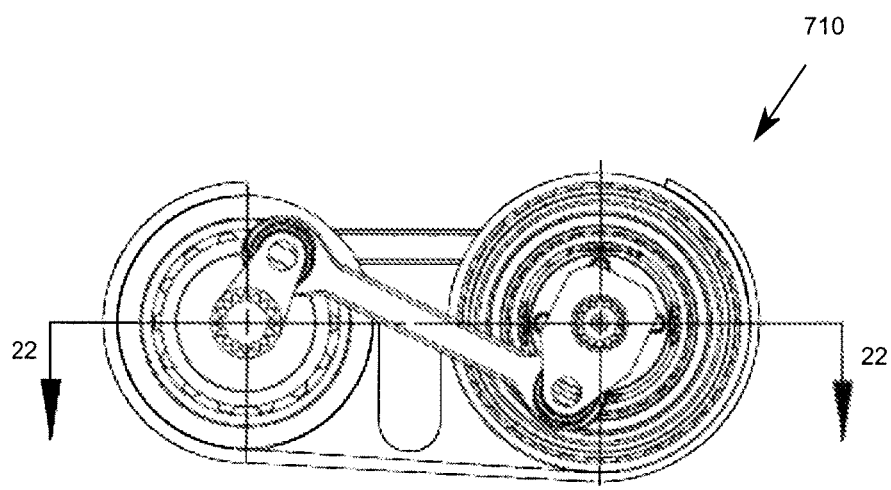
FIG. 21 is a rear view of the actuator system shown in FIG. 18.
Figure 24:
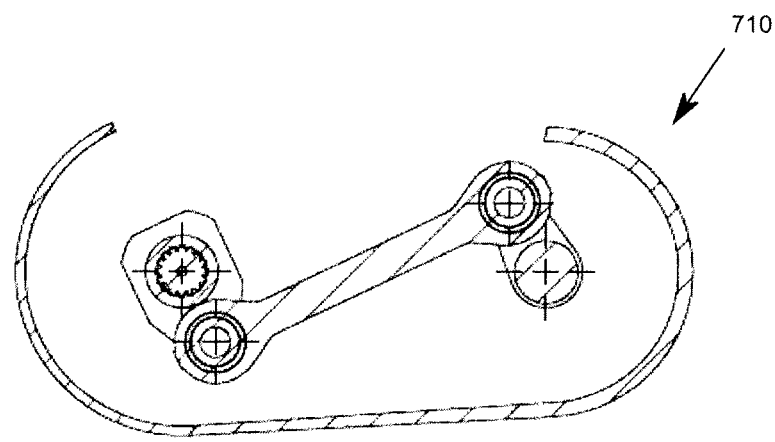
FIG. 24 is a vertical sectional view of the actuator system shown in FIG. 23, taken generally on line 24-24 of FIG. 23.
Figure 23:
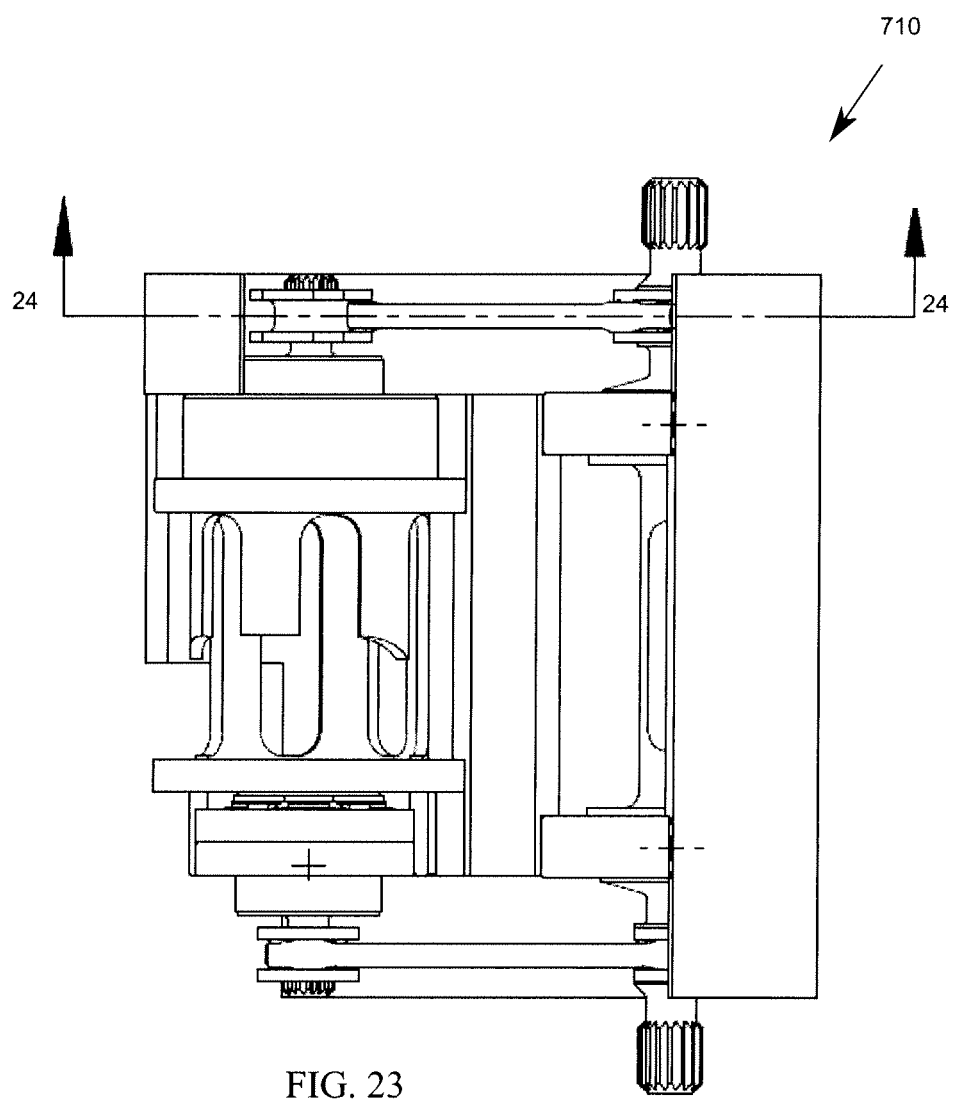
FIG. 23 is a top view of the actuator system shown in FIG. 18.

The bearing configuration of system 710 is shown in FIG. 20. Outer sheath 701 acts as a unitary member with frame 720. Bearings 702 allow cylinder 703 to rotate about axis 744 relative to frame 720. Bearings 705, held in place by cylinder 704, allow inner cylinder 706 to also rotate about axis 744 relative to frame 720. Planetary gears 707 operate between inner cylinder 706 and gear carrier 708.

System 710 has a very compact form factor with relatively large bearings for the overall size of system 710. Having relatively large bearings helps produce a system with a particularly high estimated mean time between failures.

The disclosed actuator system and method resulted in several surprising advantages. The disclosed actuator system is smaller, lighter, and faster than current hydraulic actuators. The disclosed actuator system uses power only when needed, and does not have the continuous waste associated with maintaining a hydraulic high pressure and compensating for hydraulic valve leakage. Additionally, electronic actuator controls provide higher bandwidth control than is possible with a hydraulic valve. Further, complex seals necessary in hydraulic actuators are not needed in the disclosed actuator system and method.

The disclosed actuator system and method, due to its novel and unique structure, continues to work through a jam failure. The jam failure handling works inherently in the disclosed system, without a need for release clutches. Additionally, the disclosed actuator system can be configured with a single brake to be able to handle an open actuator failure in either actuator. Current redundant electromechanical actuators need two brakes in order to handle an open failure in either system.

Further, the disclosed actuator system and method inherently increases actuator lifetime, since each actuator will typically provide only half of the work provided by the actuator system. The disclosed actuator system will continue working through either an actuator jam failure or an actuator open failure, and the malfunctioning actuator can be easily replaced at a later time after further operation. The disclosed actuator system also provides the novel ability to be able to adjust the mechanical advantage of the system during operation. Further, a mode of operation is provided in the disclosed system in which backlash can be minimized. The dual degree of freedom nature of the system also allows for the ability to conduct system self tests during operation, without needing to change the actuator output. All of these advantages and varied modes of operation are available real time in the disclosed system, i.e. the system does not need to be shut down and stopped in order to be reconfigured.

Various alternative embodiments of the disclosed actuator system and method are also possible. For example, the motors can be configured to operate with dynamic braking or regeneration. The motor drivers, dynamic braking resistor, and regeneration capacitor can be combined with the disclosed embodiments. Additionally, position sensors, such as encoders or resolvers, can be added at some of the pivot joints together with a servo controller to form a complete servo system. Heat sensors can be added to help detect and diagnose bearing and/or motor malfunction. Torque sensors can be added to the output or drive shafts to provide further operation monitoring and feedback signals.

Therefore, while the presently-preferred form of the actuator system and method has been shown and described, and several modifications discussed, persons skilled in this art will readily appreciate that various additional changes may be made without departing from the scope of the invention.

The invention claimed is:

1. An actuator system comprising:
   an element configured for rotary movement about a first axis relative to a reference structure;
   a linkage system connected to said element and said reference structure;
   said linkage system having a link configured for rotary movement about a second axis relative to said reference structure;
   said first axis and said second axis being substantially parallel and operatively offset a substantially constant distance;
   said linkage system configured and arranged such that a first angle of rotation between said element and said reference structure may be driven independently of a second angle of rotation between said link and said reference structure;
   a first rotary actuator connected to said linkage system and arranged to rotationally control a first degree of freedom of said linkage system;
   a second rotary actuator coupled to said linkage system and arranged to rotationally control a second degree of freedom of said linkage system, said first degree of freedom and said second degree of freedom being independent degrees of freedom;
   wherein said first actuator is configured and arranged to drive rotation of said element about said first axis when said second degree of freedom is operatively locked.

2. The actuator system as set forth in claim 1, wherein said linkage system comprises:
   a first linkage connected to said element at a first element connection offset from said second axis and extending from said first element connection to a first member connection offset from said first axis;
   a second linkage connected to said element at a second element connection offset from said second axis and extending from said second element connection to a second member connection offset from said first axis;
   a first member connected to said first linkage and said first rotary actuator;
   said first member configured and arranged for rotary movement about a third axis relative to said link;
   a second member connected to said second linkage and said second rotary actuator; and
   said second member configured and arranged for rotary movement about a fourth axis relative to said link.

3. The actuator system as set forth in claim 2, wherein:
   said first rotary actuator is configured and arranged to control rotation of said first member;
   said second rotary actuator is configured and arranged to control rotation of said second member;
   said first rotary actuator, said first member and said first linkage are configured and arranged to rotate said element about said second axis relative to said reference structure when said second rotary actuator operatively locks rotation of said second member about said fourth axis relative to said link; and
   said link, said first and second members and said first and second rotary actuators configured and arranged such that said link rotates about said first axis when said second rotary actuator operatively locks rotation of said second member about said fourth axis relative to said link.

4. The actuator system as set forth in claim 2, wherein said first, second, third, and fourth axis are substantially parallel to each other.

5. The actuator system as set forth in claim 2, wherein said first member connection and said second member connection are positioned on opposite sides of an imaginary line through said first axis and said second axis or said first element connection and said second element connection are positioned on the same side of an imaginary line through said first axis and said second axis.

6. The actuator system as set forth in claim 2, wherein said third axis is coincident with said fourth axis.

7. The actuator system as set forth in claim 6, wherein said first axis is coincident with said third axis.

* * * * *